US008090372B2

(12) United States Patent
Brunel et al.

(10) Patent No.: US 8,090,372 B2
(45) Date of Patent: Jan. 3, 2012

(54) METHODS AND DEVICES FOR DETERMINING IF A HANDOVER HAS TO BE EXECUTED FOR A TERMINAL

(75) Inventors: Loic Brunel, Rennes Cedex (FR); Alain Mourad, Rennes Cedex (FR); David Mottier, Rennes Cedex (FR)

(73) Assignee: Mitsubishi Electric Corporation, Tokyo (JP)

( * ) Notice: Subject to any disclaimer, the term of this patent is extended or adjusted under 35 U.S.C. 154(b) by 411 days.

(21) Appl. No.: 12/364,789

(22) Filed: Feb. 3, 2009

(65) Prior Publication Data

US 2009/0209258 A1     Aug. 20, 2009

(30) Foreign Application Priority Data

Feb. 15, 2008 (EP) .................................. 08002820

(51) Int. Cl.
*H04W 36/00* (2009.01)
(52) U.S. Cl. ............... 455/436; 455/435; 455/452.1; 370/331; 370/322; 370/347; 370/328; 370/458
(58) Field of Classification Search ............... 455/436, 455/435, 452.1; 370/322, 347, 328, 458
See application file for complete search history.

(56) References Cited

U.S. PATENT DOCUMENTS

| 6,026,301 | A * | 2/2000 | Satarasinghe | 455/436 |
| 2007/0019667 | A1* | 1/2007 | Mottier et al. | 370/458 |
| 2009/0088176 | A1* | 4/2009 | Teo et al. | 455/452.1 |
| 2010/0150044 | A1* | 6/2010 | Kim et al. | 370/311 |

FOREIGN PATENT DOCUMENTS

| EP | 1 746 743 A1 | 1/2007 |
| GB | 2 418 806 | 4/2006 |

OTHER PUBLICATIONS

"UE-specific idle period for half-duplex communications", TSG RAN WG1, R1-062369, Mitsubishi Electric, IPWireless, XP-002494759, Retrieved from the Internet: URL: www.3gpp.org; Tallinn, Estonia; Aug. 27-Sep. 1, 2006; 11 pages.
"UE-specific idle period for half-duplex communications", TSG RAN WG1, R1-071847, Mitsubishi Electric, XP-002494760, Retrieved from the Internet: URL: www.3gpp.org; Beijing, China; Apr. 17-20, 2007; pp. 1-8.
U.S. Appl. No. 12/364,760, filed Feb. 3, 2009, Brunel, et al.

* cited by examiner

*Primary Examiner* — David Q Nguyen
(74) *Attorney, Agent, or Firm* — Oblon, Spivak, McClelland, Maier & Neustadt, L.L.P.

(57) ABSTRACT

The present invention concerns a method for determining if a handover of a first half-duplex terminal has to be executed from a first to a second base station. The first base station:
    transfers signal in the cell of the first base station,
    receiving a message transferred by the first half-duplex terminal in response to the signal transferred by the first base station, the message comprising information relative to quality measurements on the signals transferred by the first and second base stations,
    receiving a message indicating if the idle period of the cell of the second base station is compatible with the round trip delay of the first half-duplex terminal in the cell of the second base station,
    determining if a handover of the first half-duplex terminal has to be executed according to the compatibility.

9 Claims, 5 Drawing Sheets

METHODS AND DEVICES FOR DETERMINING IF A HANDOVER HAS TO BE EXECUTED FOR A TERMINAL

The present invention relates generally to a method and a device for determining, in a wireless cellular telecommunication network, if a handover has to be executed for a terminal.

In state of the art of wireless cellular telecommunication networks, each terminal is regularly assigned a candidate set of base stations, which could in theory handle the communication. These candidate base stations may be for instance base stations surrounding the base station which is currently handling the terminal. Each terminal regularly measures, or measures on demand, i.e. after a particular event, the quality of the signals in the candidate measurement channels of the different candidate base stations. These measurements are then reported by the terminal to the base station which is currently handling the terminal which may decide whether to start a handover procedure.

Alternatively, a candidate set of base stations is not assigned to the terminals. Each terminal performs measurements with the base stations from which it receives signals of the measurement channel with enough quality. Then, the terminal reports the measurements to the base station which is currently handling the terminal which may decide whether to start a handover procedure or to validate a handover procedure requested by the terminal.

Such a state-of-the-art handover is valid for full-duplex terminals but may lead to some issues for half duplex terminals.

A full-duplex terminal is a terminal which is able to transmit and receive radio signals simultaneously.

A half-duplex terminal is a terminal which is not able to transmit and receive radio signals simultaneously. For instance, the terminal operates in Time Division Duplex (TDD) mode, with transmission and reception on the same frequency band but at different time periods. The terminal may also operate in Frequency Division Duplex (FDD) mode, with transmission and reception on different frequency bands and at different time periods.

When a base station transmits symbols at time te to a half-duplex terminal, these symbols are received by the terminal located at a distance d from the base station at a time equal to te+RTD(d)/2, where RTD(d) is the Round Trip Delay for the terminal. These symbols are processed by the terminal which then may transmit also symbols over the uplink channel to the base station. Before transmitting symbols over the uplink channel, the terminal TE has to wait for a period of time, said Receive Transmit Switch time or simply switching time and referred to as RTS, in order to take into account the duration of hardware and software operations. For instance, this delay RTS is the maximum of the time needed by hardware equipments of the terminals to switch between reception and transmission modes and the time needed by hardware equipments of the base station to switch between transmission and reception modes. Thus, the symbols transmitted over the uplink channel cannot be received at the base station BTS before a time tr equal to te+RTD(d)+RTS+$D_{DL}$, $D_{DL}$ being the total duration of the symbols the terminal can receive in the downlink channel.

As example, if we consider a base station having a FDD cell radius of 10 km which is compatible with the Third Generation Partnership Project Long Term evolution (3GPP/LTE), an idle period duration which corresponds to two symbols duration needs to be created, either at both the base station and the terminal sides or only at the terminal side in order to make the base station able to handle terminals located at any position in the cell. An idle period duration which corresponds to two symbols duration allows half-duplex terminals located at a distance from the base station up to 19.6 km to be handled by the base station.

An idle period duration which corresponds to one symbol duration allows only half-duplex terminals located at a distance from the base station up to 8.3 km to be handled by the base station. With such idle period duration, even if the quality of the signals of the measurement channel is sufficiently high, a half duplex terminal located at a distance larger than 8.3 km from the base station can not be handled by the base station whereas a full-duplex terminal could.

Thus, during communication, a handover procedure may be requested towards a base station whereas the half-duplex terminal can not be handled by the base station as the round trip delay between the base station and the terminal is not compatible with the idle period of the base station.

The present invention aims at avoiding that a handover is executed for a half-duplex terminal which can not cope with the idle period requirement of the target base station.

To that end, the present invention concerns a method for determining, in a wireless cellular telecommunication network, if a handover of a first half-duplex terminal has to be executed from a first base station to a second base station, each base station transferring signals in a respective cell, the first half-duplex terminal, when being handled by a base station, not transferring and not receiving signals during a period of time, called idle period of the cell of the base station which handles the first half-duplex terminal, characterized in that the method comprises the steps, executed by the first base station, of:

transferring signal in the cell of the first base station, receiving a message transferred by the first half-duplex terminal in response to the signal transferred by the first base station, the message comprising information relative to quality measurements on the signal transferred by the first base station and at least quality measurements on the signal transferred by the second base station, receiving a message indicating if the idle period of the cell of the second base station is compatible with the round trip delay of the first half-duplex terminal in the cell of the second base station, determining if a handover of the first half-duplex terminal has to be executed from the first base station to the second base station according to the compatibility of the idle period of the cell of the second base station with the round trip delay of the first half-duplex terminal in the cell of the second base station and the information relative to quality measurements.

The present invention concerns also a device for determining, in a wireless cellular telecommunication network, if a handover of a first half-duplex terminal has to be executed from a first base station to a second base station, each base station transferring signals in a respective cell, the first half-duplex terminal, when being handled by a base station, not transferring and not receiving signals during a period of time, called idle period of the cell of the base station which handles the first half-duplex terminal, characterized in that the device is included in the first base station and comprises:

means for transferring signal in the cell of the first base station, means for receiving a message transferred by the first half-duplex terminal in response to the signal transferred by the first base station, the message comprises information relative to quality measurements on the signal transferred by the first base station and at least quality measurements on the signal transferred by the second base station, means for receiving a message indicating if the idle period of the cell of the second base station is compatible with the round trip delay of the first half-duplex terminal in the cell of the second base station, means for determining if a handover of the first half-duplex terminal has to be executed from the first base station to the second base station according to the compatibility of the idle period of the cell of the second base station with the round trip delay of the first half-duplex terminal in the cell of the second base station and the information relative to quality measurements.

Thus, the compatibility of the round trip delay of the first half-duplex terminal with the idle period of the cell of the second base station is checked before starting the handover procedure and the handover procedure is safer.

According to a particular feature, the message indicating if the idle period of the cell of the second base station is compatible with the round trip delay of the first half-duplex terminal in the cell of the second base station is received from the second base station or from the first half-duplex terminal.

According to a particular feature, the first base station transfers to the first half duplex terminal a list identifying second base stations which may handle the first half-duplex terminal.

Thus, the number of quality measurements to be received by the base station is limited and comprises at most quality measurements on signals transferred by the base stations which are identified in the list. Thus, uplink signalling is reduced. Moreover, the chances to receive quality measurements on the signal transferred by second base station with enough quality are maximized.

According to a particular feature, the first base station transfers to each second base station identified in the list, the identifier of the first half-duplex terminal handled by the first base station.

Thus, the processing resources at each second base station are saved.

According to a particular feature, the first base station:

receives from the second base station, the identifier of a second half-duplex terminal handled by the second base station.

receives a message from the second half-duplex terminal, determines if the first base station can handle the second half-duplex terminal according to the time of reception of the message received from the second half-duplex terminal.

Thus, the compatibility of the idle period of the cell of the first base station with the round trip delay of the second half-duplex terminal is easy to check.

According to a particular feature, the first base station transfers a message to the second base station indicating if the first base station can or cannot handle the second half-duplex terminal.

Thus, the handover procedure is secured in advance.

According to a particular feature, the first base station transfers a message to the second half-duplex terminal indicating if the first base station can or cannot handle the second half-duplex terminal.

Thus, the handover procedure is accelerated.

The present invention concerns also a method for enabling the determination, in a wireless cellular telecommunication network, if a handover of a first half-duplex terminal has to be executed from a first base station to a second base station, each base station transferring signals in a respective cell, the first half-duplex terminal, when being handled by a base station, not transferring and not receiving signals during a period of time, called idle period of the cell of the base station which handles the first half-duplex terminal, characterized in that the method comprises the steps, executed by the first half-duplex terminal, of:

receiving signals from the first base station and the second base station, transferring signal to the second base station, determining if the idle period of the cell of the second base station is compatible with the round trip delay of the first half-duplex terminal in the cell of the second base station according to the reception or not of a message from the second base station indicating if the idle period of the cell of the second base station is compatible or not with the round trip delay of the first half-duplex terminal in the cell of the second base station, transferring a message to the first base station, the message indicating if the idle period of the cell of the second base station is or not compatible with the round trip delay of the first half-duplex terminal in the cell of the second base station.

The present invention concerns also a device for enabling the determination, in a wireless cellular telecommunication network, if a handover of a first half-duplex terminal has to be executed from a first base station to a second base station, each base station transferring signals in a respective cell, the first half-duplex terminal, when being handled by a base station, not transferring and not receiving signals during a period of time, called idle period of the cell of the base station which handles the first half-duplex terminal, characterized in that the device is included in the first half-duplex terminal and comprises:

means for receiving signals from the first base station and the second base station, means for transferring signal to the second base station, means for determining if the idle period of the cell of the second base station is compatible with the round trip delay of the first half-duplex terminal in the cell of the second base station according to the reception or not of a message from the second base station indicating if the idle period of the cell of the second base station is compatible or not with the round trip delay of the first half-duplex terminal in the cell of the second base station, means for transferring a message to the first base station, the message indicating if the idle period of the cell of the second base station is or not compatible with the round trip delay of the first half-duplex terminal in the cell of the second base station.

Thus, the handover procedure is secured as the first base station knows if the second base station can handle the first half-duplex terminal before handover request.

According to a particular feature, the first half-duplex terminal receives from the first base station a list identifying second base stations which may handle the first half-duplex terminal and transfers a signal to each second base station.

Thus, the half-duplex terminal process optimises its power consumption by transferring signals to a limited number of second base stations which are likely to handle the first half-duplex terminal.

According to still another aspect, the present invention concerns a computer program which can be directly loadable into a programmable device, comprising instructions or portions of code for implementing the steps of the method according to the invention, when said computer program is executed on a programmable device.

Since the features and advantages relating to the computer program are the same as those set out above related to the method and device according to the invention, they will not be repeated here.

The characteristics of the invention will emerge more clearly from a reading of the following description of an example embodiment, the said description being produced with reference to the accompanying drawings, among which.

The wireless cellular telecommunication network may use Time Division Duplexing scheme (TDD) or half duplex Frequency Division Duplexing scheme.

In TDD scheme, the signals transferred in uplink and downlink channels are duplexed in different sub frames, named also time slots, in the same frequency band.

In full duplex Frequency Division Duplexing scheme, the signals transferred in uplink and downlink channels are duplexed in same sub frames, named also time slots, in different frequency bands.

In half duplex FDD scheme, from the half-duplex terminal side, the signals transferred in uplink and downlink channels are duplexed in different sub frames, named also time slots, in different frequency bands. It should be noted that in such case, a base station may be able to use a full duplex Frequency Division Duplexing scheme whilst communicating with several half-duplex FDD terminals at the same time by appropriately ordering the time slots of each half-duplex FDD terminal.

When a base station BS transfers symbols to a terminal TE, the data, the signals or the messages are transferred through a downlink channel.

When a terminal TE, transfers symbols to the base station BS, the signals, the messages or data are transferred through uplink channel.

Figure 1:
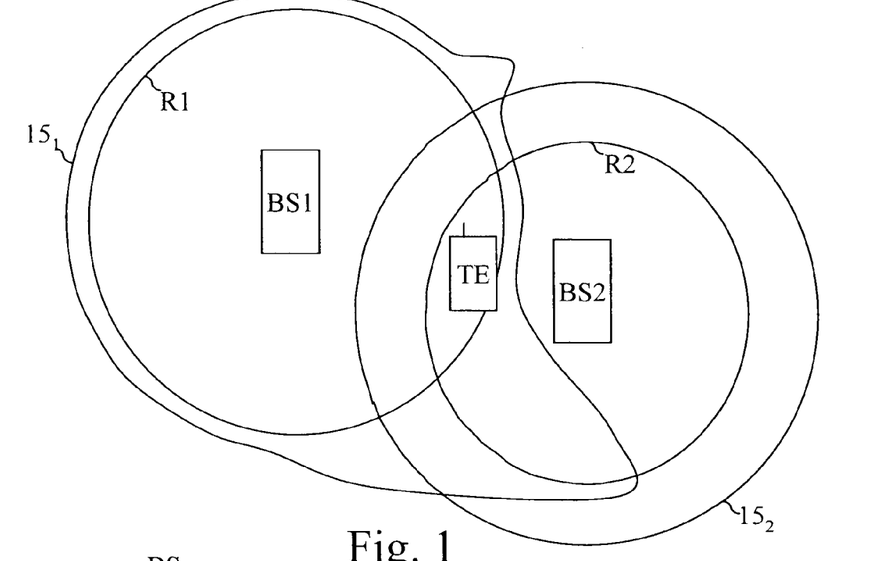
FIG. 1 is a diagram representing the architecture of the wireless cellular telecommunication network in which the present invention is implemented.

In the wireless cellular telecommunication network of the FIG. 1, a terminal TE located in the cell $15_2$ of a base station BS2 is moving to the cell $15_1$ of the base station BS1.

Only two base stations BS are shown in the FIG. 1 for the sake of simplicity but in practice, the wireless cellular telecommunication network is composed of plural base stations BS.

The cell $15_1$ of the base station BS1 is the area in which the power strength of the signals transferred by the base station BS1, like the one transferred in the measurement channel of the base station BS1, are received by a terminal TE located in the cell $15_1$ at a level which is upper than a predetermined value.

When a full-duplex terminal TE is located in the cell $15_1$ of the base station BS1, the base station BS1 can handle the full-duplex terminal TE. The full-duplex terminal TE can establish or receive a communication with a remote telecommunication device through the base station BS1. The cell $15_1$ has not a regular shape. This is mainly due to the particular locations which are in line of sight with the base station BS1 or obstructions.

The area R1 of the base station BS1 is the area in which, for each terminal TE located in R1, the sum of the round trip delay between the base station BS1 and the terminal TE and the switch between receive and transmit modes and/or the switch between transmit and receive modes is lower than or equal to the idle period of the cell $15_1$.

In other words, when a half-duplex or full-duplex terminal TE is located in the area R1 of the base station BS1, the terminal TE can be handled by the base station BS1 and can establish or receive a communication with a remote telecommunication device through the base station BS1.

When a half-duplex terminal TE is located in the cell $15_1$ and is not located in area R1 of the base station BS1, the half-duplex terminal TE can not be handled by the base station BS1 as the terminal TE has a characteristic in the cell $15_1$ which is not compatible with the idle period of the cell $15_1$.

The area R1 is included in the cell $15_1$. The difference between R1 and $15_1$ is defined by the idle period set for the cell $15_1$.

A large idle period will enable any half-duplex terminal TE to be handled by the base station BS1 but will reduce the overall capacity in term of data transferred between the base station R1 and the half-duplex terminals TE. R1 is defined so as to provide to a majority of half duplex terminals TE located in the cell $15_1$, the possibility to be handled by the base station BS1. R1 is defined so as to avoid that the idle period has to be lengthened only for a minority of half-duplex terminals TE which are far from the base station BS1.

The cell $15_2$ of the base station BS2 is the area in which the power strength of the signals, like the one transferred in the measurement channel of the base station BS2, is received by a terminal TE located in the cell $15_2$ at a level which is upper than a predetermined value. When a full-duplex terminal TE is located in the cell $15_2$ of the base station BS2, the base station BS2 can handle the full-duplex terminal TE. The full-duplex terminal TE can establish or receive a communication with a remote telecommunication device through the base station BS2.

The area R2 of the base station BS2 is the area in which, for each terminal TE located in R2, the sum of the round trip delay between the base station BS2 and the terminal TE and the switch between receive and transmit modes and/or the switch between transmit and receive modes is lower than or equal to the idle period of the cell $15_2$.

In other words, when a half-duplex or full-duplex terminal TE is located in the area R2 of the base station BS2, the terminal TE can be handled by the base station BS2 and can establish or receive a communication with a remote telecommunication device through the base station BS2.

When a half-duplex terminal TE is located in the cell $15_2$ and is not located in area R2 of the base station BS2, the half-duplex terminal TE can not be handled by the base station BS2 as the terminal TE has a characteristic in the cell $15_2$ which is not compatible with the idle period of the cell $15_2$.

The area R2 is comprised in the cell $15_2$. The difference between R2 and $15_2$ is defined by the idle period set for the cell $15_2$.

It has to be noted here that the idle period set respectively for the cells $15_1$ and $15_2$ may be equal or different.

The base stations BS comprise means for transferring downlink signals messages to the terminal TE and means for receiving messages according to the present invention.

The base stations BS are also named nodes or nodes B or enhanced nodes B or access points.

The terminal TE is a half-duplex terminal like a mobile phone, a personal digital assistant, or a personal computer. The terminal TE is also named a user equipment.

The wireless telecommunication network may be cell-synchronised. In this case, the signals originated from different cells 15 or base stations BS are simultaneously transmitted.

More precisely, the signals are structured in frames, which are themselves composed of symbols. Cell synchronisation may be ensured at the symbol level meaning that the transmission time of a symbol at a given cell 15 or base station BS matches the transmission time of a symbol at any other cell 15 or base station BS. Cell synchronisation may also be ensured at the frame level. In that case, the transmission time of a frame at a given cell 15 or base station BS matches the transmission time of a frame at any other cell 15 or base station BS. Cell synchronisation can be carried out by including a GNSS (Global Navigation Satellite System) in each base station BS.

As an alternative, the wireless telecommunication network may be cell-desynchronised. In this case, no synchronisation at the frame level nor at the symbol level needs to be ensured between different cells 15 or base stations BS.

Figure 2A:
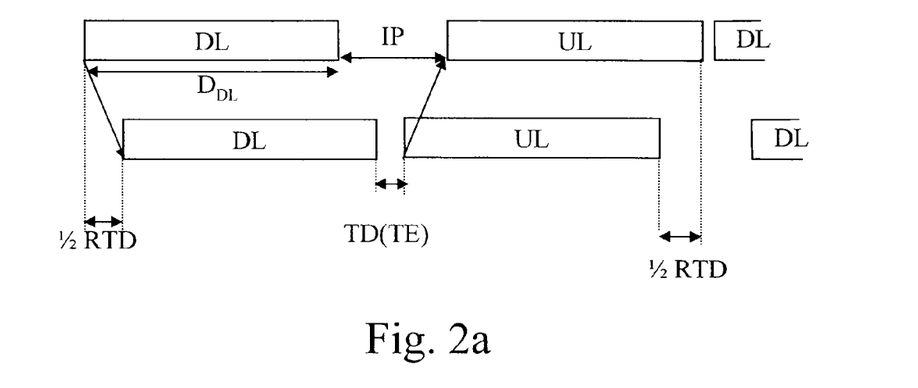
FIG. 2a is a chronogram depicting the idle period when the uplink channel is synchronous and where the base station and the half-duplex terminal don't transfer and receive signal in the idle period of the cell.

FIG. 2a is a chronogram depicting the idle period when the uplink channel is synchronous and where the base station and the half-duplex terminal don't transfer and receive signal in the idle period of the cell.

When the uplink channel is synchronous, the symbols transmitted in the uplink channel of a given cell 15 of a base station BS have to be received at the same time tr by the base station BS, regardless of the distance separating the base station BS and the terminal TE. When no signal is received or transferred during the idle period by both the base station and the half-duplex terminal side, the base station BS has to wait for the reception of the symbols transmitted by the terminal TE in order to perform the processing thereof.

The waiting time determined for the terminal TE which is located at the border of the area R1 or R2 or in other words, the largest waiting time that can be determined, is called the Guard Period or idle period IP and must be equal at least to the round trip delay RTD(Ra) plus the Receive Transmit Switch times RTS, where Ra is the radius of the area R1 or R2 if the area R1 or R2 is considered as a circle.

The base station BS1 transfers downlink symbols DL to the terminal TE. These downlink symbols DL are received by the terminal TE at a delay equal to half of the round trip delay RTD.

During the idle period IP, the base station BS doesn't transfer or receive any symbol. By not transferring or receiving any symbol, power consumption of the base station is reduced.

As the uplink symbols need to be received by the base station BS at the same time regardless of the distance separating the base station BS and each terminal TE comprised in its cell 15, the base station BS determines a timing delay TD(d) for each of the terminals TE.

The timing delay is calculated using the following formula: $TD(d)=tr-te-D_{DL}-RTD(d)=IP-RTD(d)$, where d is the distance between the terminal TE and the base station BS and $D_{DL}$ being the total duration of the symbols the terminal TE can receive in the downlink channel.

From each timing delay, the base station BS determines the Timing Advance $TA=IP-TD(d)$ for each terminal TE and transfers the Timing Advance to the corresponding terminal TE.

In case the terminal TE1 is scheduled in the uplink timeslot just following a preceding downlink timeslot comprising data for the terminal TE, the terminal TE applies its Timing Advance TA(TE) value for the transmission of symbols over the uplink channel in such a manner that the transmitted symbols are received at the base station BS from the terminal TE at the beginning of the uplink timeslot tr.

It has to be noted here that the idle period IP is discontinuous. It is composed for the terminal TE of the two time periods noted ½ RTD and the time period TD(TE).

Figure 2B:
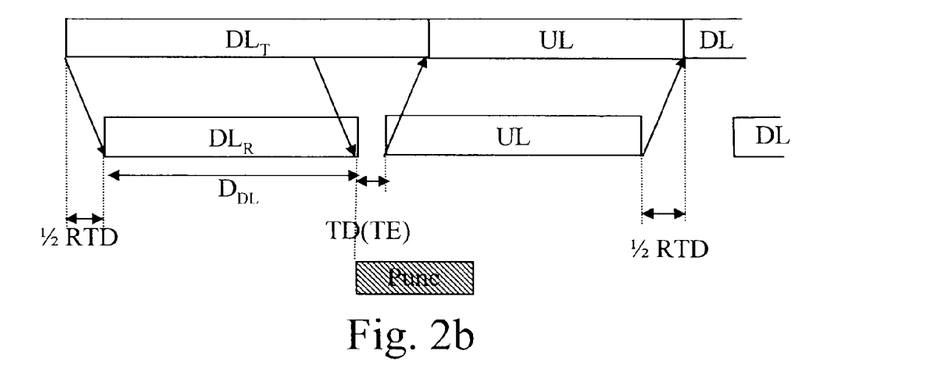
FIG. 2b is a chronogram depicting the idle period when the uplink channel is synchronous and where the half-duplex terminal does not transfer and receive signal in the idle period of the cell.

FIG. 2b is a chronogram depicting the idle period when the uplink channel is synchronous and where the half-duplex terminal does not transfer and receive signals in the idle period of the cell.

During the idle period in the example of the FIG. 2b, only the terminal TE does not receive or transfer signals.

The base station BS transfers symbols in the downlink channel $DL_T$ without any consideration of an idle period. The base station BS considers each terminal TE as being potentially a full-duplex terminal TE. The base station BS may transfer symbols even if they are not usable by the half-duplex terminals. Transferring non-usable symbols reduces development cost for manufacturing specific features of base stations BS which are able to handle full and half-duplex terminals TE.

When a half-duplex terminal TE, as example the terminal TE receives the symbols in the downlink channel $DL_T$, the terminal TE executes some puncturing on the received symbols. The terminal TE receives only the downlink symbols in $DL_R$ which are compatible with the idle period of the cell 15, i.e. the downlink symbols which are comprised in the duration $D_{DL}$ of the symbols the terminal TE can receive in the downlink channel.

The timing advance TA(TE) and the timing delay TD(TE) for the terminal TE are determined in a similar way as it has been disclosed in the FIG. 2a.

It has to be noted here that the idle period IP is continuous at the base station BS whereas it is discontinuous at the half-duplex terminal TE. It is composed for the terminal TE of the two time periods noted ½ RTD and the time period TD(TE).

Those signals Punc which are not comprised in $D_{DL}$ are not processed.

Figure 3:
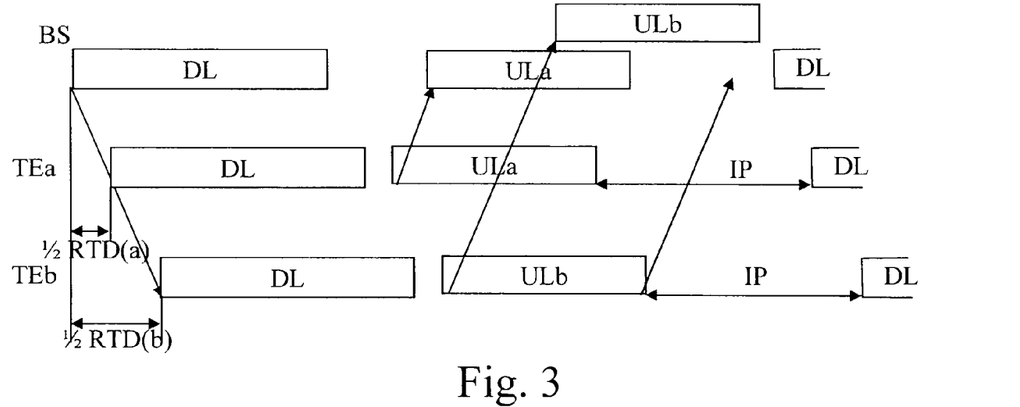
FIG. 3 is a chronogram depicting the idle period when the uplink channel is asynchronous, the wireless telecommunication network uses Time Division Duplexing scheme and the half-duplex terminal located in the cell and the base station do not transfer and do not receive signals during the idle period.

FIG. 3 is a chronogram depicting the idle period when the uplink channel is asynchronous, the wireless telecommunication network uses Time Division Duplexing scheme and the half-duplex terminal located in the cell and the base station do not transfer and do not receive signals during the idle period.

When the uplink channel is asynchronous, i.e. when the symbols transmitted in the uplink channel from different terminals TE do not have to be received at the same time, each terminal TEa or TEb transmits uplink symbols ULa or ULb over the uplink channel after a same predefined duration after the end of the reception of the signals transmitted by the base station BS in the downlink channel. The idle period is thus created at the base station BS to absorb the different propagation distance of the different terminals in the cell 15.

The terminal TEa is closer to the base station BS than the terminal TEb. The terminal TEa receives downlink symbols DL after half a round trip delay RTD(a) which is lower than half the round trip delay RTD(b) of the terminal TEb.

If the terminal TEa transfers symbols, these symbols are received by the base station BS earlier than the one transferred by the terminal TEb as it is shown in the FIG. 3.

Figure 4:
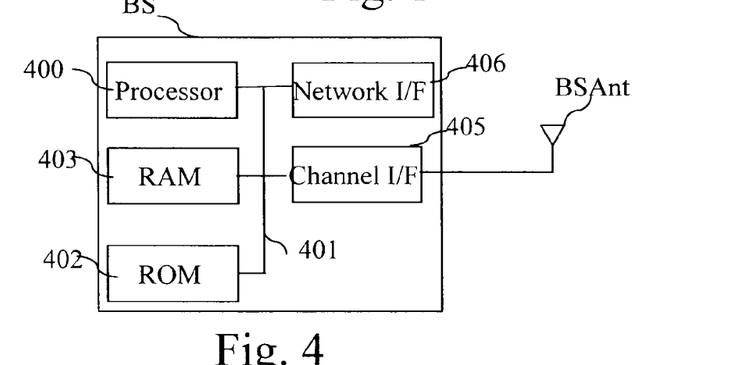
FIG. 4 is a diagram representing the architecture of a base station according to the present invention.

FIG. 4 is a diagram representing the architecture of a base station according to the present invention.

Figure 6:
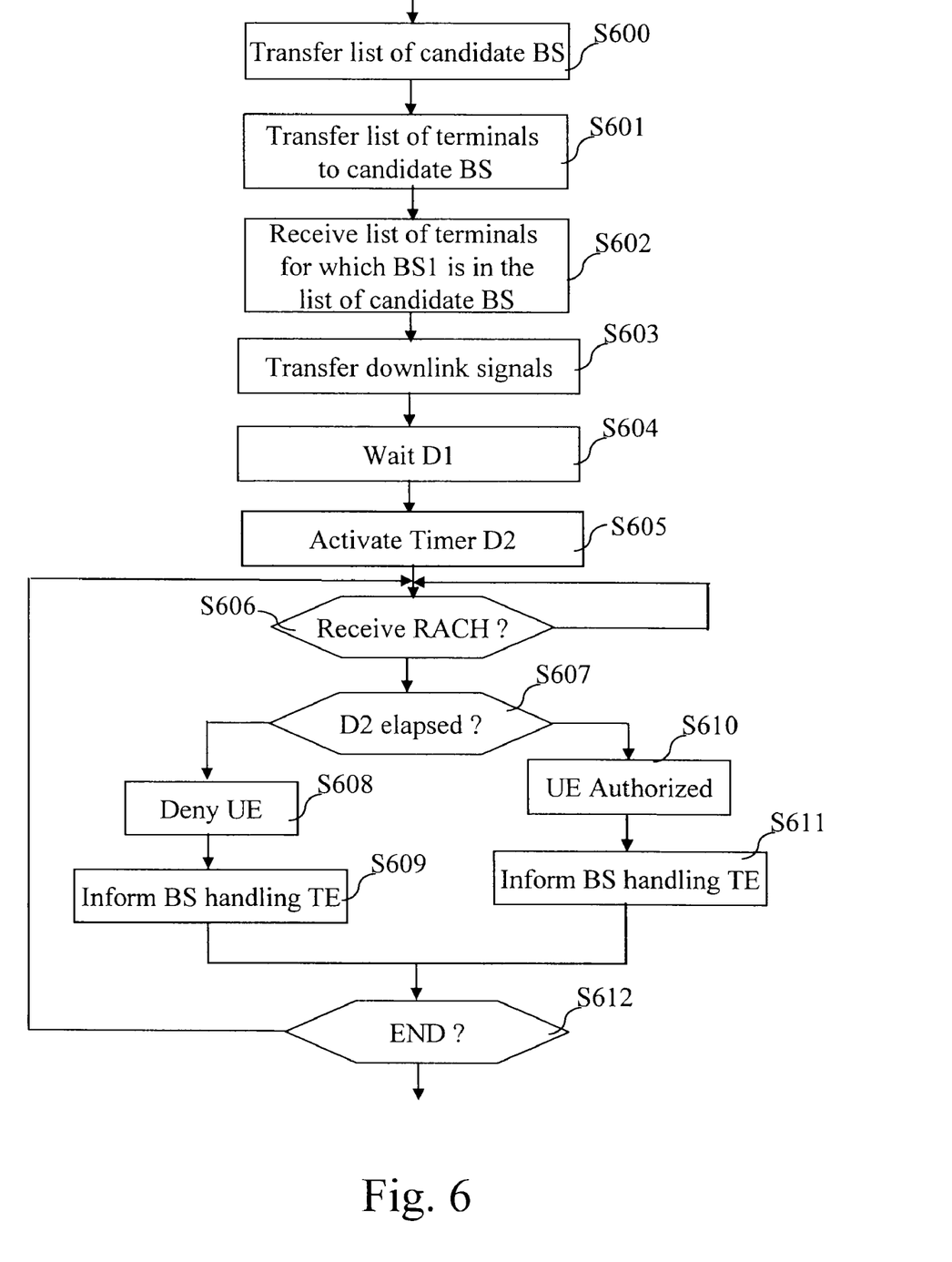
FIG. 6 is an example of an algorithm executed by a base station in order to determine if the base station can handle terminal according to the present invention.
Figure 7:
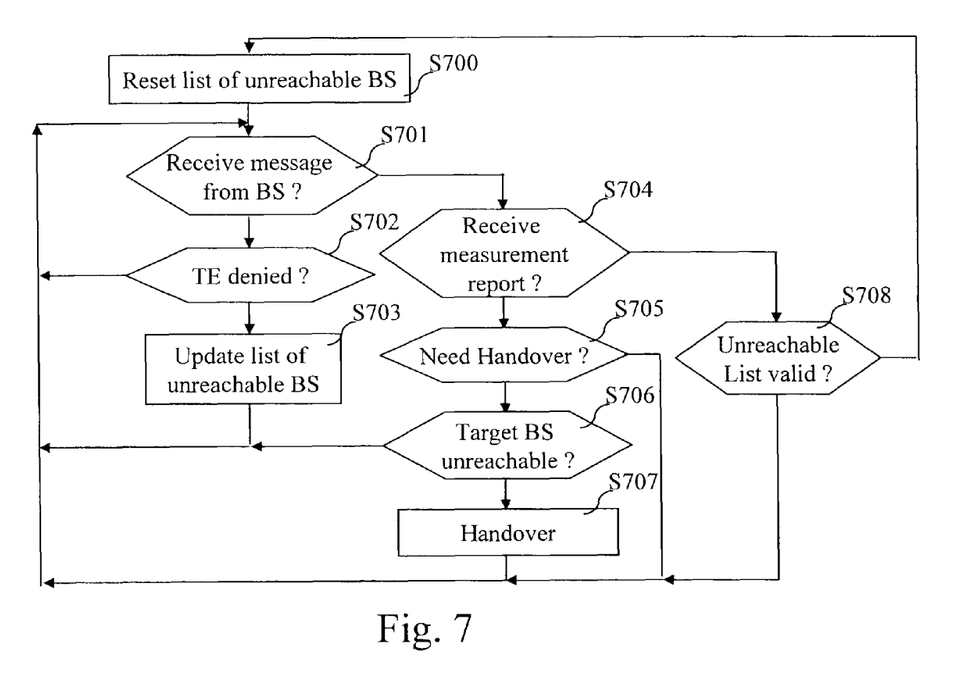
FIG. 7 is an example of an algorithm executed by a base station in order to determine if a handover has to be executed for a terminal according to the present invention.

The base stations BS, as example the base station BS1, have for example an architecture based on components connected together by a bus 401 and a processor 400 controlled by the program related to the algorithm as disclosed in the FIGS. 6 and 7.

It has to be noted here that the base station BS1 is, in a variant, implemented under the form of one or several dedicated integrated circuits which execute the same operations as the one executed by the processor 400 as disclosed hereinafter.

The bus 401 links the processor 400 to a read only memory ROM 402, a random access memory RAM 403, a channel interface 405 and a network interface 406.

The read only memory ROM 402 contains instructions of the program related to the algorithm as disclosed in the FIGS. 6 and 7 which are transferred, when the base station BS is powered on to the random access memory RAM 403.

The RAM memory 403 contains registers intended to receive variables, and the instructions of the programs related to the algorithms as disclosed in the FIGS. 6 and 7.

The channel interface 405 comprises means for transferring and/or receiving signals and/or messages to/from terminals TE through the antenna BSAnt.

The network interface 406 comprises means for transferring and/or receiving messages to/from other base stations BS of the wireless cellular telecommunication network.

Figure 5:
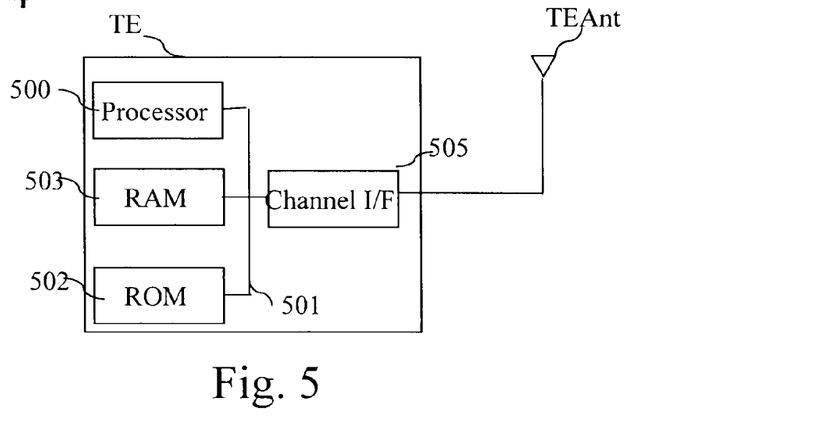
FIG. 5 is a diagram representing the architecture of a half-duplex terminal of the wireless telecommunication system according to the present invention.

FIG. 5 is a diagram representing the architecture of a half-duplex terminal of the wireless telecommunication system according to the present invention.

Figure 8:
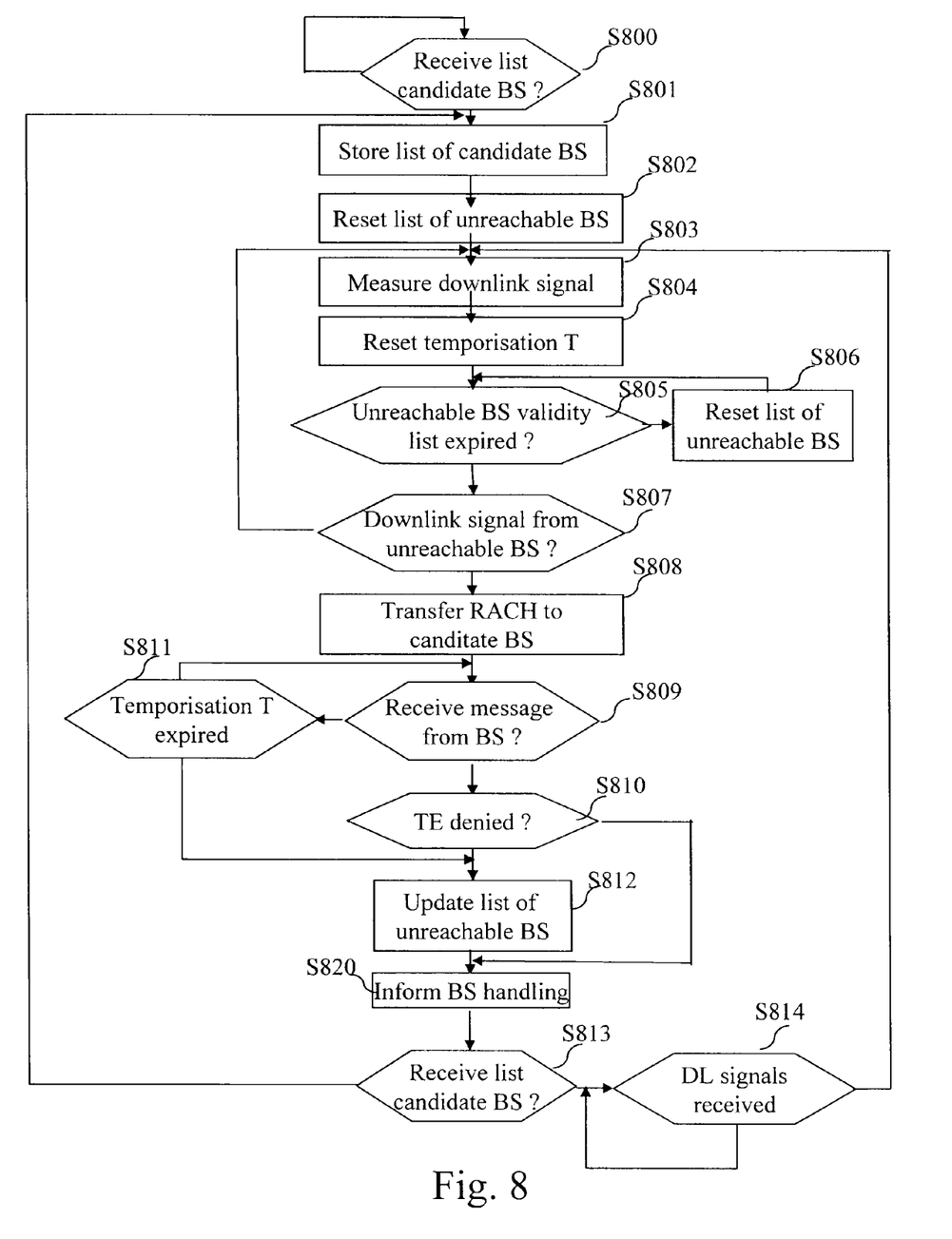
FIG. 8 is an example of an algorithm executed by a terminal in order to determine a list of base stations BS which cannot handle the terminal according to the present invention.

The terminal TE has, for example, an architecture based on components connected together by a bus 501 and a processor 500 controlled by programs related to the algorithms as disclosed in the FIGS. 8 and 9.

It has to be noted here that the terminal TE is, in a variant, implemented under the form of one or several dedicated integrated circuits which execute the same operations as the one executed by the processor 500 as disclosed hereinafter.

The bus 501 links the processor 500 to a read only memory ROM 502, a random access memory RAM 503 and a channel interface 505.

The read only memory ROM 502 contains instructions of the programs related to the algorithms as disclosed in the FIGS. 8 and 9 which are transferred, when the terminal TE is powered on to the random access memory RAM 503.

The RAM memory 503 contains registers intended to receive variables, and the instructions of the programs related to the algorithms as disclosed in the FIGS. 8 and 9.

The channel interface 505 comprises means for transferring and/or receiving signals and/or messages to/from base stations BS through the antenna TEAnt and means for measuring the signals received, as example the signals transferred in the measurement channels.

FIG. 6 is an example of an algorithm executed by a base station in order to determine if the base station can handle a half-duplex terminal according to the present invention.

More precisely, the present algorithm is executed by the processor 400 of each base station BS periodically or on particular events.

At step S600, the processor 400 of as example the base station BS1, commands the transfer of a list of candidate base stations BS to the terminals TE which are handled by the base station BS1.

As example, the list of candidate base stations BS comprises the identifiers of base stations BS surrounding the base station BS1.

At next step S601, the processor 400 commands the transfer of the list of terminals TE which are handled by the base station BS1 to each base station identified in the list of candidate base stations BS.

At step S602, the processor 400 commands the reception from the network interface 406 of the list of terminals TE which are handled by base stations BS which identify the base station BS1 in their list of candidate base stations BS they transfer to the terminals TE they handle.

At step S603, the processor 400 commands the transfer of downlink signals through the channel interface 405. The downlink signals are signals transferred in the measurement channel or are classical signals related to a communication in which the destination terminal TE is involved.

At next step S604, the processor 400 waits for a time period D1. D1 is known by each terminal TE and the base station BS1.

At next step S605, the processor 400 activates the second time period D2. D2 is at least equal to $2R_1/c$. c is the speed of light, $R_1$ is the maximum distance between the base station BS1 and a terminal TE located at the frontier of R1.

At next step S606, the processor 400 checks if an uplink signal transferred by the terminal TE in response to a signal transferred at step S603 is received by the channel interface 405. The uplink signal is a message representative of a request RACH1 to be handled by the base station BS1 or is a classical signal related to a communication in which the destination terminal TE is involved.

If a signal transferred by the terminal TE in response to a signal noted RACH transferred at step S603 is received by the channel interface 405, the processor 400 moves to step S607. Otherwise, the processor 400 returns to step S606.

At step S607, the processor 400 checks if the time period D2 is elapsed.

If the time period D2 is elapsed, the processor 400 moves to step S608. Otherwise, the processor 400 moves to step S610.

By checking once the signal is received, if D2 expires, the processor 400 determines from the received signal, if the round trip delay for the terminal TE is not upper than the idle period of the cell $15_1$ of the base station BS1.

At step S608, the processor 400 determines that the base station BS1 can not handle the terminal TE.

At step S609, thanks to the list received at step S602, the processor 400 commands the transfer of a message to the base station BS which is currently handling the terminal TE which transferred the signal informing that the base station BS1 cannot handle the terminal TE.

In a variant, the processor 400 commands the transfer of a message to the terminal TE which transferred the signal informing that the base station BS1 cannot handle the terminal TE.

The transferred message informs that the base station BS1 cannot handle the terminal TE.

After that, the processor 400 moves to step S612.

At step S610, the processor 400 determines that the base station BS1 may handle the terminal TE as the round trip delay for the terminal TE in the cell $15_1$ is compatible with the idle period.

At step S611, thanks to the list received at step S602, the processor 400 commands the transfer of a message to the base station BS which is currently handling the terminal TE which transferred the signal informing that the base station BS1 can handle the terminal TE.

In a variant, the processor 400 commands the transfer of a message to the terminal TE which transferred the signal informing that the base station BS1 can handle the terminal TE.

The transferred message informs that the base station BS1 can handle the terminal TE.

After that, the processor 400 moves to step S612.

At step S612, the processor 400 checks if it is time to stop the procedure disclosed at step S606 to S611. As example, when a time delay of two times D2 expires from the activation of D2, no more RACH signal may be received from a terminal TE. It is then time to stop the procedure disclosed at step S606 to S611.

If it is time to stop the procedure disclosed at step S606 to S611, the processor 400 interrupts the present algorithm. Later on, the processor 400 will execute again the present algorithm as example after a predetermined delay.

If it is not time to stop the procedure disclosed at step S606 to S611, the processor 400 returns to step S606 in case another terminal TE transfers a RACH message in response to the downlink signals transferred at step S603.

FIG. 7 is an example of an algorithm executed by a base station in order to determine if a handover has to be executed for a terminal according to the present invention.

More precisely, the present algorithm is executed by the processor 400 of each base station BS periodically or on particular events in parallel with the execution of the algorithm of the FIG. 6.

At step S700, the processor 400 of, as example of the base station BS1, resets, for each terminal TE the base station BS1 handles, a list of unreachable base stations. An unreachable base station BS, is for a terminal TE, a base station BS for which the idle period of the cell 15 of the base station BS is lower than the round trip delay for the terminal TE in that cell 15.

The processor 400 resets the list of unreachable base stations by making the list empty.

At next step S701, the processor 400 checks if a message which indicates if another base station can handle or not a terminal TE that the base station BS is currently handling.

If a message indicates that another base station can handle a terminal TE that the base station BS1 is currently handling, the processor 400 moves to step S702. Otherwise, the processor 400 moves to step S704.

The message is received through the network interface from one base station BS. The message received from another base station BS is as example the one disclosed at step S609 or S611 of the FIG. 6.

In a variant, the message is received through the channel interface 405 from one terminal TE.

At step S702, the processor 400 checks if the message informs that the base station BS which transferred the message cannot handle the terminal TE identified in the received message.

If the message informs that the base station BS which transferred the message cannot handle the terminal TE identified in the received message, the processor moves to step S703. If the message informs that the base station BS which transferred the message can handle the terminal TE identified in the received message, the processor 400 returns to step S701.

At step S703, the processor 400 updates the list of unreachable base stations BS of the terminal TE identified in the received message by inserting, in the list of unreachable base stations BS, the identifier of the base station BS which sent the message received at step S703.

After that, the processor 400 returns to step S701.

At step S704, the processor 400 checks if a measurement report transferred by a terminal TE handled by the base station BS1 is received through the channel interface 405.

If a measurement report transferred by a terminal TE handled by the base station BS1 is received through the channel interface 405, the processor 400 moves to step S705. Otherwise, the processor 400 moves to step S708.

A measurement report comprises, for at least a part of the base stations BS identified in the list of candidate base stations BS transferred at step S600 of the FIG. 6, quality measurements on signal transferred by the base stations BS.

At step S705, the processor 400 checks if a handover needs to be executed for the terminal TE which sent the measurement report.

A handover needs to be executed for a terminal TE when the quality measurements on signal transferred by the base station BS1 are lower than the quality measurement on signals transferred by at least one base station BS identified in the list of candidate base stations BS.

If a handover needs to be executed for the terminal TE which sent the measurement report, the processor 400 moves to step S706. Otherwise, the processor 400 returns to step S701.

At step S706, the processor 400 checks if the or each base station BS, for which the quality measurement is upper than the quality measurements on signals transferred by the base station is identified in the list of unreachable base stations of the terminal TE which sent the measurement report.

If the or each base station BS, for which the quality measurement is upper than the quality measurements on signals transferred by the base station is identified in the list of unreachable base stations, the processor 400 returns to strep S701 and does not proceed to the handover.

If one base station BS, for which the quality measurement is upper than the quality measurements on signals transferred by the base station is not identified in the list of unreachable base stations, the processor 400 selects it as the base station BS which should handle the terminal TE and moves to step S707.

At step S707, the processor 400 commands the transfer of messages notifying the terminal TE and the selected base station BS that a handover procedure should be executed with the selected base station BS. After that, the processor 400 returns to step S701.

At next step S708, the processor 400 checks if the list of unreachable base stations BS has been reset for a predetermined time duration, i.e. checks if the list of unreachable base stations BS can still be considered as valid.

If the list of unreachable base stations BS can still be considered as valid, the processor 400 returns to step S701.

If the list of unreachable base stations BS can not be considered as valid anymore, the processor 400 returns to step S700.

FIG. 8 is an example of an algorithm executed by a terminal in order to determine a list of base stations BS which cannot handle the terminal according to the present invention.

More precisely, the present algorithm is executed by the processor 500 of each terminal TE.

At step S800, the processor 500 checks if a list of candidate base stations BS is received through the channel interface 505. The list of candidate base stations is the one transferred at step S600 of the FIG. 6 by the base station BS1 which handles the terminal TE.

If a list of candidate base stations BS is received, the processor 500 moves at step S801. Otherwise, the processor 500 stays at step S800.

At step S801, the processor 500 memorises, in the RAM memory 503, the list of candidate base stations BS.

At next step S802, the processor 500 resets a list of unreachable base stations on the same way as it has been disclosed at step S700 of the FIG. 7.

At next step S803, the processor 500 commands the channel interface 505 to execute some quality measurements on downlink signals transferred by each base station BS identified as a candidate base station. The downlink signals are transferred by the candidate base stations on respective measurement channels.

At next step S804, the processor 500 resets a temporisation T which is defined as the maximum duration a half-duplex terminal TE can wait until it receives a answer from the base station after a RACH procedure.

At next step S805, the processor 500 checks if the list of unreachable base stations BS has been reset for a predetermined time duration, i.e. checks if the list of unreachable base stations BS can still be considered as valid.

If the list of unreachable base stations BS cannot be considered as valid any more, the processor 500 goes to step S806, resets the list of unreachable base stations BS and returns to step S805.

If the list of unreachable base stations BS can still be considered as valid, the processor 500 moves to step S807.

The validity of the list may change according to the terminal TE mobility, the terminal TE location information, the environment of the terminal TE, etc.

It should be noted that instead of resetting the whole list of unreachable base stations BS once the validity of the list has expired, the list of unreachable base stations BS may be reset on base station case if the presence of a specific base station BS in the list of unreachable base stations BS is no longer justified.

At step S807, the processor 500 checks if the downlink signal has been transferred from a base station BS which is not in the list of unreachable base stations BS.

If the downlink signal has been transferred from a base station BS which is in the list of unreachable base stations BS, the processor 500 returns to step S803.

If the downlink signal has been transferred from a base station BS which is not in the list of unreachable base stations BS, the processor 500 proceeds to step S808.

At next step S808, the processor 500 initiates a random access procedure towards the base station BS which sent downlink signal and which is identified in the list of candidate base stations BS. The random access procedure is initiated by transferring a signal RACH, as example through a contention-based channel of each identified base station or through a reserved channel dedicated to the communication with terminal TE. A contention-based channel is a channel that is accessible to any terminal TE with no reservation mechanisms.

At next step S809, the processor 500 checks if a message is received through the channel interface 505 from one base station BS.

If a message is received from a base station BS, the processor 500 moves to step S810. Otherwise, the processor 500 moves to step S811.

The message received from a base station BS is as the one disclosed at step S609 or S611 of the FIG. 6.

At step S810, the processor 500 checks if the message informs that the base station BS which transferred the message cannot handle the terminal TE. If the message informs that the base station BS which transferred the message cannot handle the terminal TE, the processor 500 moves to step S812. If the message informs that the base station BS which transferred the message can handle the terminal TE identified in the received message, the processor 500 moves to step S820.

At step S811, the processor 500 checks if the temporisation T defined at step S804 has expired.

If the temporisation T has expired, the processor 500 interprets this expiration as a deny from the base station BS and moves to S812.

If the temporisation T has not expired, the processor 500 returns to step S809.

At step S812, the processor 500 updates the list of unreachable base stations BS of the terminal TE by inserting in the list of unreachable base stations BS the identifier of the base station BS which transferred the downlink signal received at step S803.

After that, the processor 500 moves to step S820.

At step S820, the processor 500 commands the transfer of a message to the first base station, the message indicating if the idle period of the cell of the second base station is or not compatible with the round trip delay of the first half-duplex terminal in the cell of the second base station or in other words if the second base station BS can or cannot handle the terminal TE.

At step S813, the processor 500 checks if a list of candidate base stations BS is received through the channel interface 505.

If a list of candidate base stations BS is received through the channel interface 505, the processor 500 returns to step S801. Otherwise, the processor 500 moves to step S814.

At step S814, the processor 500 checks if downlink signals have been received through the channel interface 505.

If downlink signals have been received, the processor 500 returns to step S803. Otherwise, the processor 500 returns to step S814.

Naturally, many modifications can be made to the embodiments of the invention described above without departing from the scope of the present invention.

The invention claimed is:

1. A method for determining, in a wireless cellular telecommunication network, if a handover of a first half-duplex terminal has to be executed from a first base station to a second base station, each base station transferring signals in a respective cell, the first half-duplex terminal, when being handled by a base station, not transferring and not receiving signals during a period of time, called idle period of the cell of the base station which handles the first half-duplex terminal, the method, executed by the first base station, comprising steps of:

transferring signal in the cell of the first base station;

receiving a message transferred by the first half-duplex terminal in response to the signal transferred by the first base station, the message comprising information relative to quality measurements on the signal transferred by the first base station and at least quality measurements on the signal transferred by the second base station;

receiving a message indicating if the idle period of the cell of the second base station is compatible with the round trip delay of the first half-duplex terminal in the cell of the second base station; and determining if a handover of the first half-duplex terminal has to be executed from the first base station to the second base station according to the compatibility of the idle period of the cell of the second base station with the round trip delay of the first half-duplex terminal in the cell of the second base station and the information relative to quality measurements.

2. The method according to claim 1, wherein the message indicating if the idle period of the cell of the second base station is compatible with the round trip delay of the first half-duplex terminal in the cell of the second base station is received from the second base station or from the first half-duplex terminal.

3. The method according to claim 2, further comprising the step of:
transferring, to the first half duplex terminal, a list identifying second base stations which may handle the first half-duplex terminal.

4. The method according to claim 3, further comprising the step of:
transferring, to each second base station identified in the list, the identifier of the first half-duplex terminal handled by the first base station.

5. The method according to any one of claim 1 to 4, further comprising the steps of:
receiving from the second base station, the identifier of a second half-duplex terminal handled by the second base station;
receiving a message from the second half-duplex terminal; and
determining if the first base station can handle the second half-duplex terminal according to the time of reception of the message received from the second half-duplex terminal.

6. The method according to claim 5, further comprising the step of:
transferring a message to the second base station indicating if the first base station can or cannot handle the second half-duplex terminal.

7. The method according to claim 5, further comprising the step of:
transferring a message to the second half-duplex terminal indicating if the first base station can or cannot handle the second half-duplex terminal.

8. A device for determining, in a wireless cellular telecommunication network, if a handover of a first half-duplex terminal has to be executed from a first base station to a second base station, each base station transferring signals in a respective cell, the first half-duplex terminal, when being handled by a base station, not transferring and not receiving signals during a period of time, called idle period of the cell of the base station which handles the first half-duplex terminal, the device included in the first base station, the device comprising:
means for transferring signal in the cell of the first base station;
means for receiving a message transferred by the first half-duplex terminal in response to the signal transferred by the first base station, the message comprises information relative to quality measurements on the signal transferred by the first base station and at least quality measurements on the signal transferred by the second base station;
means for receiving a message indicating if the idle period of the cell of the second base station is compatible with the round trip delay of the first half-duplex terminal in the cell of the second base station; and
means for determining if a handover of the first half-duplex terminal has to be executed from the first base station to the second base station according to the compatibility of the idle period of the cell of the second base station with the round trip delay of the first half-duplex terminal in the cell of the second base station and the information relative to quality measurements.

9. A non-transitory computer readable storage medium having instructions stored therein which can be directly loadable into a processor for implementing the steps of the method according to anyone of claim 1 to 4.

\* \* \* \* \*